United States Patent [19]

Dawkins

[11] 4,114,585
[45] Sep. 19, 1978

[54] INTERNAL-COMBUSTION ENGINES

[75] Inventor: Terence Brian Dawkins, Fakenham, England

[73] Assignee: Terrytune Developments Limited, London, England

[21] Appl. No.: 502,196

[22] Filed: Aug. 30, 1974

Related U.S. Application Data

[63] Continuation-in-part of Ser. No. 290,756, Sep. 20, 1972, abandoned.

[30] Foreign Application Priority Data

Sep. 28, 1971 [GB] United Kingdom ............ 45238/71

[51] Int. Cl.² ........................................... F02B 23/00
[52] U.S. Cl. ................................ 123/191 M; 123/84; 123/188 R
[58] Field of Search ............... 123/32 A, 75 B, 84, 123/85, 86, 87, 119 R, 188 R, 191 L, 191 M, 191 T

[56] References Cited

U.S. PATENT DOCUMENTS

| 781,802 | 2/1905 | Barber | 123/85 |
| 1,722,216 | 7/1929 | Hodgson et al. | 123/191 L |
| 2,222,134 | 11/1940 | Augustine | 123/32 A |
| 3,168,083 | 2/1965 | Buchanan | 123/191 M |
| 3,556,060 | 11/1967 | Henry-Biaband | 123/75 B |

FOREIGN PATENT DOCUMENTS 330,756  8/1919  Fed. Rep. of Germany ...... 123/188 R

OTHER PUBLICATIONS

Basic Cams, Valves & Exhaust Systems, No. 2, Petersen Publishing Co., 1971, pp. 109–113.

Primary Examiner—Charles J. Myhre
Assistant Examiner—David D. Reynolds
Attorney, Agent, or Firm—Larson, Taylor and Hinds

[57] ABSTRACT

A spark-ignition four-stroke gasoline engine, of the commonly mass-produced type having a plurality of cylinders provided each with two poppet valves mounted in a cylinder-head of the engine and constituting respectively an inlet valve, for passing a fuel-air mixture to the cylinder, and an exhaust valve for passing exhaust gases to an exhaust manifold of the engine, is given exhaust valves which are at least 7% greater in area than the inlet valves.

7 Claims, 4 Drawing Figures

INTERNAL-COMBUSTION ENGINES

This application is a continuation-in-part of my application Ser. No. 290,756 filed Sept. 20, 1972 now abandoned.

The invention relates to gasoline internal-combustion engines for motor vehicles.

It is common for a mass-produced motor-driven vehicle to have as its prime mover a high-speed spark-ignition internal-combustion gasoline (petrol) engine of the kind having a plurality of cylinders, each of which has a piston fitted therein and is provided with two (and only two) poppet valves, arranged and controlled separately from one another and constituting respectively a single inlet valve and a single exhaust valve, each of said poppet valves comprising a closure member mounted in a cylinder-head of the engine for movement into and out of closing engagement with one (and only one) valve seat therefor, and operating in accordance with a four-stroke cycle in which each piston is driven in its cylinder by expansion of gases heated by combustion of gasoline-air mixture delivered from an inlet manifold of the engine to a combustion chamber at one end of the cylinder, by way of the inlet valve of the cylinder, the combustion products being expelled from each cylinder, by way of its exhaust valve, to an exhaust manifold of the engine. It will be appreciated that the vast majority of modern production-line (mass-produced) petrol engines are of this kind, most of them having a compression ratio less than 11:1. For convenience, such an internal combustion engine will be referred to in the following description as an engine of the aforesaid kind.

It will be appreciated that in this specification, as in the art generally, the term "valve" is used in some instances in a broad sense, in which it denotes the combination of a valve port (an opening, at the end of a valve passage, surrounded by and defined within a valve seat) and a closure member comprising a stem bearing a disc-like head which is movable into or out of engagement with the valve seat in order to close or open the valve port, whilst in other instances the term "valve" is used in its alternative narrower sense denoting the movable closure member alone; the particular meaning of the term when used is generally clear from its context, but specific values given for valve diameter always denote the diameter of the disc-like head of the aforesaid movable closure member. However, it should of course be appreciated that the area of the valve port will always be closely related to the diameter of the disc-like head of the movable closure member in accordance with normal practice. Thus, a reference to an increase in valve diameter implies both an increase in the diameter of the head of the movable member and a corresponding increase in the diameter of the valve port and its surrounding valve seat with which the head of the movable member is adapted to engage.

Now, it is generally assumed that, in an engine of the aforesaid kind, the inlet valve diameter should be made larger than (or at least equal to) that of the exhaust valve, in order to optimise gas flow conditions in the engine. This assumption may have been based upon the reasoning that whereas the exhaust stroke of the piston produces a positive pumping action, which can eject the combustion products efficiently through a relatively small hole (exhaust valve port), intake of air into each cylinder, being generally brought about only by a suction effect due to movement of the piston away from the cylinder head, requires a relatively large hole (inlet valve port) for optimum operation of the engine.

The literature indicates that the ratio of exhaust-valve flow capacity to inlet-valve flow capacity is in the range from 0.60 to 1.0 for most gasoline engines; the flow capacity of a poppet valve depends upon the valve diameter, flow-capacity ratios of 0.7 and 1.0, for example, corresponding respectively to exhaust-to-inlet valve diameter ratios of substantially 0.83 and 1.0, for exhaust and inlet valves of similar design. Indeed it seems to have been accepted as a feature of generally overriding importance, in determining the sizes of inlet and exhaust valves, that the inlet-valve flow capacity should be made relatively large with a view to obtaining maximum possible "volumetric efficiency" (defined as the mass of fresh mixture which passes into the cylinder in one suction stroke, divided by the mass of the mixture which would fill the piston displacement at inlet density).

It is of interest that a series of tests were carried out by Eppes et al, at the Massachusetts Instutute of Technology, and reported in Technical Note No. 1365 of the National Advisory Committee for Aeronautics, entitled "The effect of changing the ratio of exhaust-valve flow capacity to inlet-valve flow capacity on volumetric efficiency and output of a single-cylinder engine". This report was dated October 1947 and will be referred to hereinafter as "NACA TN No. 1365". These tests were carried out on a laboratory form of four-stroke single-cylinder two-valve internal-combustion gasoline engine under strictly controlled conditions such as to maintain an inlet pressure equal to the exhaust pressure, and were designed to investigate variation of volumetric efficiency and brake mean effective pressure for conditions assumed to be equivalent to flow-capacity ratios (exhaust-valve flow capacity to inlet-valve flow capacity) varying from about 0.51 to 1.79. The report concluded that, under the particular laboratory conditions maintained, a flow-capacity ratio of approximately 1.00 gave highest brake mean effective pressure; reducing the flow-capacity ratio from 1.00 to 0.69 effected only a small reduction, if any, in brake mean effective pressure; and highest volumetric efficiency over the speed range concerned was obtained with a flow-capacity ratio of 0.69 (increasing this ratio to 1.00 gave only a slight reduction, if any, in volumetric efficiency). A flow-capacity ratio of 0.69 was said to correspond to a ratio of exhaust-to-inlet valve diameters of 0.83 for valves of similar design.

It is to be noted, however, that Eppes et al did not actually increase the valve diameters, but obtained their results by changes in valve lift that they assumed to be equivalent to their postulated changes in valve diameter.

NACA TN No. 1365 refers to an earlier report (NACA TN No. 915, dated November 1943), upon a series of tests made with a laboratory form of four-stroke single-cylinder two-valve internal-combustion gasoline engine operated with various sizes of inlet-valve diameter, keeping the exhaust valve of constant size. The exhaust and inlet pressures were maintained constant. These earlier tests were concerned only with the effects of changes at the inlet valve, and so employed an exhaust valve much larger than any of the inlet valves used, simply in order to minimise variations due to exhaust effects. There was, of course, no suggestion that such an arrangement should be employed in any practical form of engine, for use as a prime mover, outside the laboratory; nor was there any suggestion in NACA TN No. 1365.

It should perhaps be mentioned also that German Patent Specification No. 330,756 (Kuers) described an early form of two-valve internal combustion engine having an exhaust valve which was larger than its inlet valve. However, the engine with which Kuers was concerned was basically very different from any engine of the aforesaid kind, since in the Kuers engine a high-boiling-point fuel passed through the inlet valve in liquid form, the exhaust valve being positioned essentially below the inlet valve to receive the liquid fuel so that contact with the hot exhaust valve could bring about vaporisation of the fuel in the combustion chamber. The exhaust valve was therefore made as large as possible, and of dished form, simply in order to promote this vaporisation.

The test results in NACA TN No. 1365, obtained with an engine which bore a much closer relation (than the Kuers engine) to an engine of the aforesaid kind, apppeared to support the proposition that no really useful result could be achieved by increasing the exhaust valve size above that of the inlet valve, and it was suggested subsequently that, in order to secure the largest feasible inlet-valve capacity, a good design compromise would be to make the ratio of exhaust-valve to inlet-valve flow capacity in the range 0.70 to 0.75. With similar valve design, for a two-valve cylinder, this gives an exhaust valve diameter in the range 0.83 to 0.87 of the inlet valve diameter.

Accordingly it has become generally accepted practice, as a normal design criterion for conventional production-line engines of the aforesaid kind, to make the exhaust valves smaller in diameter than the inlet valves, although occasional use has been made of equal-sized valves.

Indeed, this teaching seems to have built up into a strong prejudice against the possibility that any significant overall advantages might stem from using exhaust valves larger than the inlet valves in such an engine. As a result, for example, it is stated near the bottom of the third column of page 72 of the Petersen Specialty Publication "Basic Cams, Valves & Exhaust Systems No. 2" (Petersen Publishing Co.—Second printing—1971) that "in all recent engines the intake valve head diameter is larger than that of the exhaust".

In discussing the modification of existing engines, with a view to achieving more power, at the bottom of the third column on page 110 of the aforementioned Petersen publication the advice is given that if one does not wish to go to the expense of a complete modification, involving "pistons, big intake valves, better carburetion, bigger and better combustion chambers, intake porting, and a wilder cam", a useful budget job can be accomplished by restricting attention to the exhaust ports and valves, going "a bit rich on the carburetion", and getting "a good set of headers to take full advantage of the exhaust work". However, it is clear from the last complete paragraph on the lefthand side of page 106 of the Petersen publication that this "budget job" is recommended only in respect of the majority of American production V-8 engines which "come stock with fairly decent intake valves". Indeed, it is clear from the whole of the Petersen publication that the engines shown, for the most part, have inlet valves very much larger than their exhaust valves, and there is certainly no suggestion that the above-mentioned prejudice should be ignored. Thus, although it is suggested in an article entitled "Engine Breathing" commencing on page 128 of the Petersen publication, that the performance of many an engine is restricted basically by its exhaust system, the article concerned clearly contemplates enlargement of the exhaust capability of the engine by attention to such features as exhaust porting and the fitting of expensive headers in place of the usual exhaust manifolds, and thereafter the emphasis once again seems to be upon improvement of the intake system to take full advantage of the possibilities afforded by the improvements in the exhaust system. Although there is brief reference to the fact that the use of larger valves can increase flow, there is no suggestion that the exhaust valves alone should be increased, and there is certainly no hint that it might be worthwhile increasing the exhaust valve to a size significantly larger than that of the inlet valve. Furthermore, a paragraph bridging columns 1 and 2 of page 75 of the aforesaid Petersen publication discourages the arbitrary installation of larger-diameter valves, with particular reference to a suggested danger that larger valves will generally run hotter than smaller ones, and suggests that such enlargement of the valves may be particularly dangerous in respect of the exhaust valves.

A set of headers, of course, is a high-performance exhaust system which may be fitted, in place of the normal exhaust manifold system of a production-line engine, when seeking to maximize horsepower. It generally comprises a set of relatively lengthy individual outlet tubes leading from the respective exhaust valve passages of the engine, the outlet ends of the tubes being often connected to a common collector box, to which may be fitted a muffler (silencer) for street use. For the purposes of normal production-line engines in everyday use, however, the additional expense of such header systems would probably be unacceptable to the public in general, and, in the words of the aforesaid Petersen publication (Page 168), "the factories have found that no tubing unit can compare with the cast iron exhaust manifolds for sheer brute service".

Now, in terms of such factors as power, fuel economy, and atmospheric pollution effects, the performance of conventional production-line engines of the aforesaid kind can hardly be said to have achieved perfection. Indeed, so many of these mass-produced engines are in daily use throughout the world that even relatively small overall improvements in performance could prove of considerable commercial and environmental importance. In the past, however, it has often been the case that a suggested modification of an engine of this kind, whilst bringing about an improvement in one aspect of the engine's performance, has restorted in an unacceptably disadvantageous change in some other aspect of the engine's performance.

For example, the modifications discussed in general in the aforementioned Petersen publication are directed towards the "hotting-up" of engines, with the emphasis always upon achievement of extra horse-power. The modifications described, even the above-mentioned budget job, could generally be expected to produce significant reductions in fuel economy (less miles per gallon), i.e. substantial increases in fuel consumption, and would almost certainly result also in the emission of greater quantities of pollutants in the exhaust gases, and possibly also a considerable increase in noise from the exhaust systems. For example, using a richer mixture with a given engine is generally expected to give increased emission of CO and HC, although NOx may possibly be reduced slightly. All of this may possibly be quite acceptable, of course, in the context of hot-rodding. However, the cost of such modifications, not only in financial terms, with regard to the use of such expensive items as exhaust header systems, but also in terms of reduced fuel economy and increased environmental polution, generally render such modifications unacceptable for incorporation in the vast majority of such engines, at the production-line stage, for normal everyday usage.

It is an object of the present invention to enable improvements to be achieved in production-line engines of the aforesaid kind, for example such as to give greater fuel economy and/or a significant reduction of environmental pollution without significantly off-setting effects in other respects.

The present invention is based upon the surprising discovery that such worthwhile overall advantages can be achieved by adapting an internal combustion engine, of the aforesaid kind, to employ exhaust valves which are at least 7% greater in area than the inlet valves. This provides a new design criterion, which goes directly contrary to the great weight of prior opinion and practice as embodied in the aforesaid prejudice.

According to one aspect of the present invention there is provided a high-speed spark-ignition internal-combustion engine, for powering a motor vehicle, of the kind having a plurality of cylinders, each of which has a piston fitted therein and is provided with two and only two poppet valves, arranged and controlled separately from one another and constituting respectively a single inlet valve and a single exhaust valve, each of said poppet valves comprising a closure member mounted in a cylinder-head of the engine for movement into and out of closing engagement with one and only one valve seat therefor, and operating in accordance with a four-stroke cycle in which each piston is driven in its cylinder by expansion of gases heated by combustion of a gasoline-air mixture delivered to a combustion chamber at one end of the cylinder by way of the inlet valve of the cylinder, the combustion products being expelled from each cylinder, by way of its exhaust valve, to an exhaust manifold of the engine, and the compression ratio of the engine being less than 11:1, characterised in that the area of the exhaust valve of each cylinder is at least 7% greater than that of the inlet valve.

An improved form of engine, embodying the present invention, can be designed and manufactured as such, using normal production-line techniques adapted in a simple manner to provide the engine with the required exhaust and inlet (intake) valves, such that the exhaust valves are at least 7% greater in area than the inlet valves, without the need to replace the normal exhaust manifold by a relatively expensive exhaust header system such as is recommended in the aforesaid Petersen publication.

Such an engine can be used, for example, to power a wheel-borne vehicle, with the usual transmission means arranged for transmitting drive from the engine to at least one wheel of the vehicle. Also, of course, such an engine could be used to power a water-borne vehicle, having transmission means arranged for transmitting drive from the engine to a propeller-shaft of the vehicle.

As an interim measure, the new design criterion of the present invention can be applied to good effect in improving the performance of some existing engines. Thus, according to a second aspect of the present invention there is provided a method of improving a high-speed spark-ignition internal-combustion engine, for powering a motor vehicle, of the type having a plurality of cylinders, each of which has a piston fitted therein and is provided with two and only two poppet valves, arranged and controlled separately from one another and constituting respectively a single inlet valve and a single exhaust valve, each of said poppet valves comprising a closure member mounted in a cylinder-head of the engine for movement into and out of closing engagement with one and only one valve seat therefor, and operating in accordance with a four-stroke cycle in which each piston is driven in its cylinder by expansion of gases heated by combustion of a gasoline-air mixture delivered to a combustion chamber at one end of the cylinder by way of the inlet valve of the cylinder, the combustion products being expelled from each cylinder, by way of its exhaust valve, to an exhaust manifold of the engine, the compression ratio of the engine being less than 11:1, and the exhaust valves being of smaller area than the inlet valves, said method comprising the step of modifying the engine to make it an internal-combustion engine which is of the said type except that the area of the exhaust valve of each cylinder of the modified engine is at least 7% greater than that of the inlet valve.

Thus, it is possible to produce significant overall improvements in the performance of some commonly available production-line engines, of the aforesaid kind, in which the exhaust valves are smaller than (or possibly equal to) the inlet valves, by modifying each engine so as to make it an engine, of the aforesaid kind, wherein the area of the exhaust valve of each cylinder is more than 7% greater than that of the inlet valve; the overall nature of the improvement is such that routine experimentation with such factors as carburation and timing then enables a desired balance to be achieved between increase in fuel economy (more miles per gallon) and reduction of the proportion of certain pollutants (e.g. hydrocarbons and carbon monoxide) in the exhaust emissions, without significant loss of power. Such modification can be effected, for example, by replacing the original cylinder-head by a replacement cylinder-head formed to take exhaust valves and inlet valves such that the exhaust valves are more than 7% larger in area than the inlet valves.

Results obtained by application of the invention to a spark-ignition petrol (gasoline) engine, originally in conventional form, can in some instances be improved upon by reducing the compression ratio of the engine, and/or by increasing the size of the or each carburettor of the engine, and/or by varying the fuel/air mixture control function. Thus, whilst it seems at present that the compression ratios of engines to which the invention is applied will generally be in the range from 7:1 to 11:1, it seems preferable in some cases that an engine to which the invention has been applied should have its compression ratio in the lower range, say from 7:1 to 8.5:1.

Tests carried out so far suggest that the exhaust valve area in an engine to which the invention has been applied will preferably be in the range from 15% to 65% greater than the inlet valve area, but of course it will be appreciated that a certain amount of routine experimentation will be required to determine the best way of applying the invention to any given particular form of the engine of the aforesaid kind.

The benefits obtainable by means of the present invention may perhaps be due basically to more efficient exhaust of the combustion products, through the increased exhaust valve area, so that each subsequent combustion mixture contains less burnt gases. This in turn may serve to reduce residual pre-ignition effects, with associated power losses, and thereby give a further improvement in the efficiency of the combustion process. The improvements could thus be cumulative in nature. In this way the combustion efficiency of the engine can apparently be improved so as to give better power, torque, and/or fuel economy (lower fuel consumption), and/or a reduction in the proportion of pollutants such as hydrocarbons and/or carbon monoxide and/or nitrogen oxides (NOx) in the exhaust gases. However, it must be emphasised that the above-postulated explanation of the manner in which the invention achieves the worthwhile results concerned is extremely tentative, and much further research may be necessary to explain how such worthwhile results are achievable by adopting the new design criterion, which goes directly contrary to the long-established prejudiced against the use of exhaust valves larger than the inlet valves.

Environmental pollution by the lead content of exhaust gases from present-day high-compression engines, using high-octane fuel with its correspondingly high content of lead additives for reducing engine knock, is another problem which embodiments of the present invention can help to reduce. The alternative of using low-octane fuel, and designing engines to operate with a correspondingly low compression ratio, normally appears unattractive because of the overall drop in performance which has hitherto been associated with such decreases in compression ratio (with a given engine capacity). Tests on one form of commercially available spark-ignition petrol engine of the aforesaid kind, however, indicate that although the performance is reduced, as expected, when the engine is modified to operate with a lower compression ratio (say 7.4:1), and accordingly run on 91-octane fuel, application of the invention to this modified form of the engine can result in performance figures that are not significantly inferior, in terms of brake horse-power and fuel consumption, to those obtained with the original conventional engine when run on 97-octane fuel before such reduction of the compression ratio. Of course, the use of 91-octane petrol, instead of 97-octane petrol, for example, can have the important result of reducing significantly the lead content of the engine exhaust gases. Even more encouraging test results have been obtained recently with completely lead-free gasoline in an embodiment of the present invention.

The fact that the worthwhile results achievable by the invention were not made evident by the tests reported in NACA TN No. 1365 may possibly be accounted for, to some extent, by the facts that those tests were carried out only on a laboratory form of single-cylinder engine, operating under abnormal conditions of aspiration such that the exhaust pressure was maintained equal to the inlet pressure, and that allegedly equivalent variations in valve lift were employed instead of actual variations in valve diameters. For example, variation of valve lift may not affect the initial outward surge of exhaust gases, at the commencement of an exhaust stroke, as much as actual variation of exhaust valve diameter.

Reference will now be made, by way of example, to the accompanying diagrammatic drawings, in which.

Figure 1:
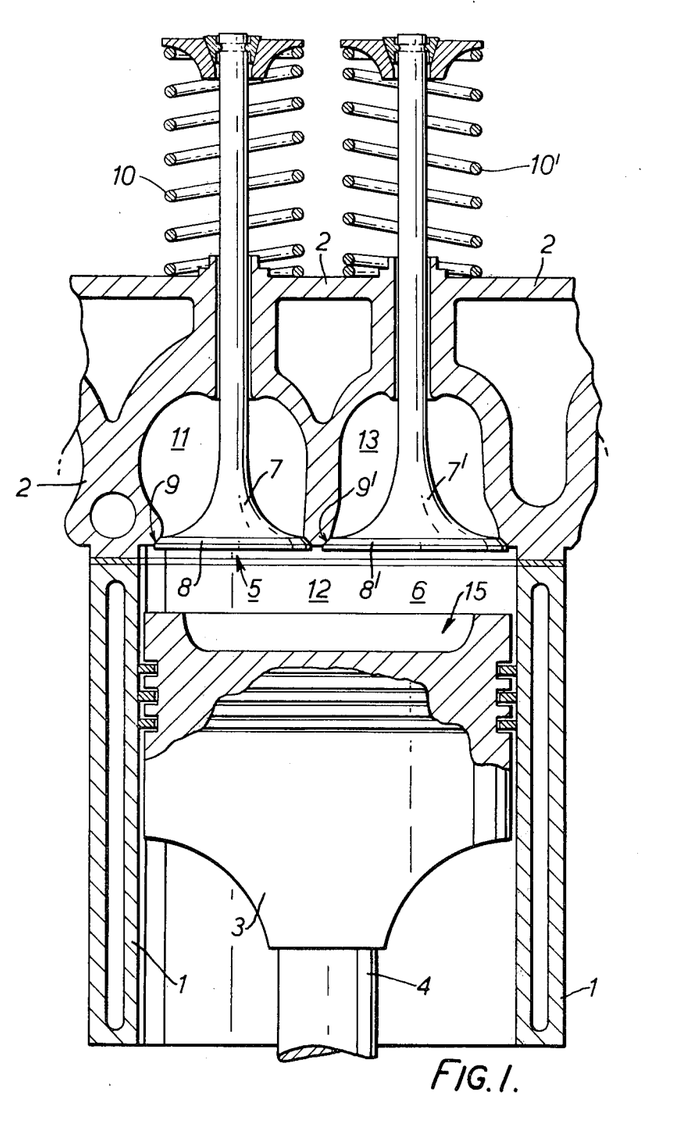
FIG. 1 shows an axial section through part of an engine, of the aforesaid kind, to which the present invention has been applied.

FIG. 1 illustrates the piston and valve arrangements for one cylinder of a common British motor car engine of substantially 1300 cm$^3$ capacity. The engine is a 4-cylinder cross-flow petrol engine having, in its standard form, a compression ratio of 9.2:1. FIG. 1 shows the engine, however, after it has been modified, in accordance with the present invention, in the manner to be described in more detail hereinafter with reference to FIG. 2. It will be appreciated that the spark-plug and other details of the illustrated cylinder, and the rest of the engine, are not shown in the drawings, for the sake of convenience, these features being purely conventional and requiring no additional explanation.

In FIG. 1, wall portions bounding the illustrated cylinder are indicated at 1, and a cylinder head 2 is fitted in conventional manner over the top of the cylinder. A piston head 3 is fitted slidably in the cylinder and is connected in conventional manner, by way of a piston rod 4, to the engine crank-shaft (not shown). The crown of the piston head 3 is recessed centrally to provide a combustion chamber bowl 15.

The cylinder head 2 is provided with two poppet valves at the top of the cylinder, being respectively the standard inlet valve 5 and an exhaust valve 6. The inlet valve 5 comprises movable closure member 7 whose head, of diameter D (measured as shown, for the exhaust valve, in FIG. 2), is formed with a truncated conical surface 8 adapted to engage a corresponding truncated conical valve seat 9 formed, at a lower surface of the cylinder head 2, around the inlet valve port. The inlet valve port, being the aperture through which the usual vaporised-fuel/air mixture leaves inlet valve passage 11 to enter combustion chamber 12 (that part of the interior of the cylinder which is above the piston head 3) in the course of the induction stroke of the piston, is defined by the inner periphery of the truncated conical valve seat 9, and the inlet valve 7 is movable downwardly, against the action of valve spring 10, to open the inlet valve port as the piston moves downwardly in the course of its induction stroke.

The exhaust valve 6 is constructed in a generally similar manner to the inlet valve 5, as indicated by the use of the reference numerals 7', 8', and 9', being movable downwardly in the usual way, against the action of spring 10', to allow gaseous combustion products to pass from the combustion chamber 12 into exhaust valve passage 13 during upward movement of the piston 3 during its exhaust stroke. The plane of the exhaust valve port is indicated in FIG. 2 by a line A—A.

Operation of the valves is controlled conventionally, by a side cam-shaft situated in the cylinder block and driving push-rods which control finger-rockers that are mounted on pedestals on the cylinder head and engage the valves 7 and 7' at their upper ends in well-known manner. Being completely conventional this valve operating mechanism is not shown in the drawings.

Figure 2:
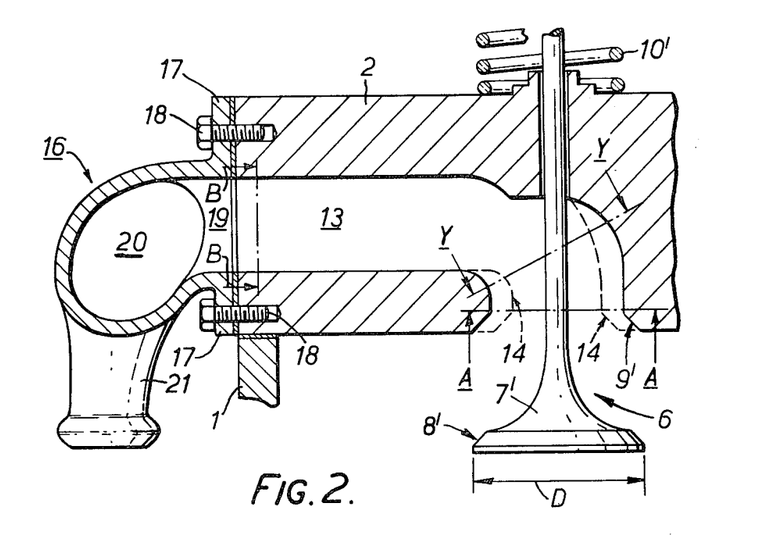
FIG. 2 shows a section, taken at right angles to the plane of FIG. 1, through a part of the structure shown in FIG. 1.

FIG. 2 shows more particularly the exhaust valve structure, but the general form of the inlet valve 5 and the inlet valve passage 11 may be considered, for the purposes of the following description, as generally similar to that of the exhaust valve 6 and the exhaust valve passage 13.

In addition, FIG. 2 shows an exhaust manifold 16, as normally supplied with the engine in its standard conventional form, bolted to the cylinder head 2 by bolts 18 passing through flanges 17. As usual, the manifold has respective short intake ducts 19 arranged to deliver the exhaust emissions from the passages 13 (only one being seen in FIG. 2) to a common manifold passageway 20, whence the emissions pass out of the manifold by way of a common down-pipe portion 21.

Details of the illustrated engine in its standard form, supplied as prime mover in a well-known British motor car, are as follows:

inlet valve diameter (D) — 35.71 mm.
exhaust valve diameter (D) — 31.75 mm.
inlet valve port diameter (at A—A) — 32.3 mm.
exhaust valve port diameter (at A—A) — 26.0 mm.
inlet valve passage diameter along Y—Y in FIG. 2 — 31.0 mm.
exhaust valve passage diameter along Y—Y — 25.0 mm.
exhaust valve passage diameter along B—B in FIG. 2 — 28.0 mm.
ignition timing (static) — 6° before top dead centre.

For the purposes of comparison, one such engine in this standard form was tested with 97-octane fuel, under laboratory conditions, with the following results (corrected to a temperature of 37.8° C. and a dry air pressure of 747.27 mm Hg):

brake horse power (BHP) at 5,000 r.p.m. — 51.12
brake horse power at 6,000 r.p.m. — 45.22
specific fuel consumption at 5,000 r.p.m. — 0.606/lb/BHP/hour
specific fuel consumption at 6,000 r.p.m. — 0.755 lb/BHP/hour
exhaust temperature at 5,000 r.p.m. — 745° C.
exhaust temperature at 6,000 r.p.m. — 770° C.

The engine ran at a constant oil pressure of 41 lbs/sq.in., the exhaust temperature remained stable, and there were no signs of overheating. The standard size and form of the exhaust valve seat, and the exhaust valve passageway in the immediate vicinity of the exhaust valve port, are indicated diagrammatically by broken lines 14 in FIG. 2.

The tests were carried out at substantially 1,000 r.p.m. intervals from 6,000 r.p.m. down to 1,000 r.p.m., measuring the brake horse-power, torque, and specific fuel consumption figures at each point, whereafter the engine was run up a second time, using the same set of conditions, except that in this second set of tests measurements were made of the carbon monoxide and unburnt hydrocarbon contents of the exhaust gases.

The present invention was then applied to this engine, by opening up the exhaust valve port to take a valve substantially 7% greater in area ($\pi D^2/4$) than the inlet valve. The form of the exhaust valve passage 13 was obviously correspondingly relieved slightly in the immediate vicinity of the exhaust valve port, to avoid the presence of a marked step change in diameter near the valve port, but the engine was otherwise left in its conventional form. The relevant details of the engine as modified thus were as follows:

inlet valve diameter (D) — 35.72.
exhaust valve diameter (D) — 37.0 mm.
inlet valve port diameter (A—A) — 32.3 mm.
exhaust valve port diameter (A—A) — 32.6 mm.
inlet valve passage diameter at Y—Y — 31.0 mm.
exhaust valve passage diameter at Y—Y — 25.0 mm.
exhaust valve passage diameter at B—B — 28.0 mm.

The tests described above, in relation to the engine in its standard form, were then repeated upon the modified engine. At no time during these tests did the modified engine run erratically or show any signs of undue crankshaft vibrations or tendency to overheating.

The new test results showed some improvement in torque at 1,000 r.p.m. and 6,000 r.p.m., but some drop in torque over the mid-range from about 1200 r.p.m. to 5,000 r.p.m. This flattening of the torque curve, however, can be advantageous in giving a wider usable band of engine speeds. Specific fuel consumption was much the same as for the standard form of the engine, except for a rise to 0.817 lb/BHP/hr at 6,000 r.p.m., which was not considered unacceptable in view of other advantages achieved. Brake horsepower remained much the same as that for the standard engine, for speeds up to 5,000 r.p.m. (where the figure for the modified engine was 51.7BHP), but then increased significantly above that for the standard engine and gave a much shallower fall-off of power, giving a value of 51.7 BHP also at 6,000 r.p.m. Thus a power increase of about 14% is achieved at 6,000 r.p.m. In addition, the hydrocarbon content of the exhaust gases showed a remarkable improvement, being reduced by up to about 50% (at 3,000 r.p.m.) as compared with the corresponding figures for the standard engine. The exhaust temperature of the modified engine, as compared with the standard engine, was down by about 19° C. at 6,000 r.p.m. and by 5° C. at 5,000 r.p.m.

It was found that further improvements in performance of the engine could be achieved (particularly in mid-range BHP figures and specific fuel consumption) by increasing the exhaust valve size further, to make the area ($\pi D^2/4$) of the exhaust valve about 26% greater than that of the inlet valve. In order to achieve these additional improvements, however, it was found necessary (in addition to enlarging the exhaust valve) to replace the standard carburettor supplied with the standard engine by a carburettor normally fitted to a 1600 cm$^3$ version of the engine, with an appropriate inlet manifold, and to run the engine without its air filter. This was interesting in its implications with regard to possible further development of the invention.

At the end of the tests (all using 97-octane fuel) there were no indications of unacceptable piston burning or excessive valve wear, seat shrinkage, or seat pitting, despite the fact that the replacement valves 7' used were of normal inlet valve material, with no special facing.

With a view to testing a suspicion that the practically useful degree of enlargement of the exhaust valve, in accordance with the invention, would be greater with a low-compression engine than with a high-compression engine, the standard 1300 cm$^3$ engine described above was then modified to operate with a compression ratio of only 7.4:1. This was done by machining the piston crown (around the combustion chamber bowl 15) to remove 0.140 inches therefrom, and similarly relieving the combustion chamber bowl 15 uniformly (maintaining its basic shape) to give it a volume of 25 cm$^3$. The total combustion chamber volume, including the head gasket clearance, was then substantially 50 cm$^3$. Using the standard cylinder-head and valves, and making no other modifications to the standard engine, a test run was then carried out as before except that the readings were taken at speeds from 6,000 r.p.m. down to substantially 2,000 r.p.m. only, and the fuel used was only 91 octane, with the following results (corrected as before):

brake horse power at 5,000 r.p.m. — 44.28
    brake horse power at 6,000 r.p.m. — 37.06
    specific fuel consumption at 5,000 r.p.m. — 0.683 lb/BHP/hr
    specific fuel consumption at 6,000 r.p.m. — 0.886 lb/BHP/hr The exhaust temperature at speeds from 5,000 r.p.m. upwards was in excess of 800° C., peaking at about 850° C., and the torque only reached 55.93 lb-foot (at 3,000 r.p.m.), dropping to 33.48 lb-foot at 6000 r.p.m. The engine ran well except for the excessive exhaust heat, although the specific fuel consumption was clearly rather high.

A cylinder head modified, in accordance with the invention, to give an exhaust valve area 7% greater than the inlet valve area was then fitted, the modified engine having the following details:

inlet valve diameter (D) — 35.72 mm.
    exhaust valve diameter (D) — 37.0 mm.
    inlet valve port diameter (at A—A) — 32.3 mm.
    exhaust valve port diameter (at A—A) — 32.6 mm.
    inlet valve passage diameter at Y—Y — 31.0 mm.
    exhaust valve passage diameter at Y—Y — 27.0 mm.
    exhaust valve passage diameter at B—B — 28.0 mm.

The resulting modified low-compression engine, otherwise unchanged as compared with the abovedescribed low-compression form of the standard engine, was then subjected to the same test run. Some improvements in performance were indicated by the test results (as compared with those for the low-compression form of the standard engine), but much better results were obtained in a subsequent series of similar tests upon the engine with the cylinder head further modified to make the exhaust valve about 26% greater in area than the inlet valve in accordance with the following details:

inlet valve diameter (D) — 35.72 mm.
    exhaust valve diameter (D) — 40.1 mm.
    inlet valve port diameter (at A—A) — 32.3 mm.
    exhaust valve port diameter (at A—A) — 35.0 mm.
    inlet valve passage diameter at Y—Y — 31.0 mm.
    exhaust valve passage diameter at Y—Y — 29.0 mm.
    exhaust valve port diameter at B—B — 28.0 mm.

In this form the cylinder head was as illustrated diagrammatically in FIG. 2, in full lines, in the neighbourhood of the exhaust valve 6. In the testing, the engine seemed to run more smoothly and to start more easily. The following results were noted during the tests (using 91-octane fuel):

brake horse power at 5,000 r.p.m. — 47.15
    brake horse power at 6,000 r.p.m. — 45.05
    specific fuel consumption at 5,000 r.p.m. — 0.631 lb/BHP/hr
    specific fuel consumption at 6,000 r.p.m. — 0.717 lb/BHP/hr The BHP stayed above the values obtained (with the low compression ratio) with the standard cylinder head and valves over the whole of the testing range (showing an increase of about 21% at 6,000 r.p.m.). The torque at 2,000 r.p.m. showed an improvement of about 5 lb-ft, and the torque followed a continuous curve remaining at least 3 lb-ft above that for the standard cylinder head (with the low compression pistons) throughout the testing range.

Exhaust temperatures were down by as much as 50° C. as compared with the low-compression engine using the standard cylinder head. The hydrocarbon content of the exhaust gases was slightly higher than that for the standard cylinder head (low compression-ratio engine) at 5,000 and 6,000 r.p.m., but was significantly lower than that for the standard cylinder head at 3,000 r.p.m. The CO content of the exhaust gases was somewhat higher than that for the standard cylinder head. Specific fuel consumption was significantly lower than that for the standard cylinder head throughout the whole testing range.

Thus application of the invention to a low-compression engine was found to give worthwhile improvements in both torque and brake horse-power, with reductions in exhaust temperatures and considerably better fuel consumption figures.

As with the high compression engine, tests were then made on the modified low-compression engine with a larger carburettor system and without an air filter, and results indicated substantial additional improvements in brake horse-power, torque, and specific fuel consumption. Indeed, a power of 51.3 BHP was indicated at 5,000 r.p.m., this figure being 0.18 BHP more than that obtained with the engine in its conventional high-compression form.

In addition to these laboratory tests, the invention has been applied to a variety of engines fitted in road vehicles, and thereafter tested on the road, with extremely encouraging results in terms of improved fuel consumption, improved acceleration, and improved maximum speed. These improvements were all achieved as a result of modifying the engines by fitting exhaust valves larger than their inlet valves, although in some cases it was found desirable, in order to achieve best results, to fit larger carburettors to the engines. Such practical applications of the invention have been made to various spark-ignition petrol engines, with varying degrees of success, for example by making the exhaust valve areas ($\pi D^2/4$) about 13%, 18%, 21%, 22%, 46%, and even 65% greater, for example, than the associated inlet valve areas.

Furthermore, it is found that some applications of the invention can enable an engine with a compression ratio of as much as 10:1 to be run satisfactorily on 91-octane fuel without retarding the ignition. However, it is felt that better results may generally be achieved in such cases if the compression ratio is lowered.

Figure 3:
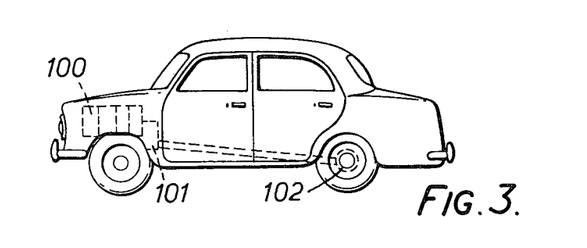
FIG. 3 shows a side view of a wheel-borne motor vehicle.
Figure 4:
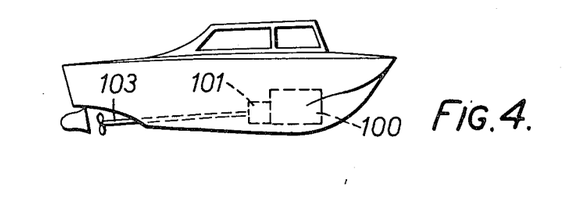
FIG. 4 shows a side view of a water-borne motor vehicle.

An engine similar to that illustrated in FIGS. 1 and 2, to which the present invention has been applied, may be fitted as prime mover 100 in each of the motor vehicles illustrated in FIGS. 3 and 4, wherein conventional transmission systems 101 are mounted for transmitting drive in the usual way from the engines 100 to road wheels 102 and a propeller shaft 103 respectively.

In a more recent series of road tests, an attempt was made to obtain some indications of the relative effectiveness of different fuels and different mixture control conditions when used with an embodiment of the present invention. For this purpose use was made of two closely similar British Leyland Mini 1000 (manual)

motor cars, both registered in Great Britain in 1974, which will be referred to hereinafter as cars A and B respectively. At the commencement of the test series the mileage reading shown by the meter in car A was 14708.3, while that on the meter of car B was 11604.0. During each test, the cars were run one behind the other, in convoy, and mileage readings were taken only from the meter of car B. The measured compression ratio of each car was 8.3:1, and the engine capacity of each car was 998 cc. The cars both had the same make and size of tyre fitted, being in generally similar condition. As initially obtained, both cars were in standard form, each having the usual inlet and exhaust manifolds and the usual S.U. carburettor Type HS fitted with the standard taper needle Type GX. It will be appreciated that a wide range of taper needles is readily available for this particular type of carburettor, to provide a choice enabling the carburettor to be used with a wide variety of different engines, and use was made during some of the tests, as described below, of a "weaker" needle, Type BO, which has the same maximum thickness as the GX needle but tapers less rapidly.

As supplied, the standard inlet valve head diameter was 27.76 mm, and the standard exhaust valve head diameter was 25.4 mm.

Road tests were then carried out as follows, using the same route for each test. The test route could be regarded broadly as having three sections which are referred to hereinbelow as Route Sections I, II, and III, respectively.

Route Section I was of a generally rural character, extending for about 97.7 miles along various kinds of English country roads. It will be appreciated that the mileage readings given here and below for different runs over the same Route Section tended to vary from day to day by a few tenths of a mile.

Route Section II was a generally urban section, covering about 39.6 miles in usually heavy traffic in London (England), so that the average speed was generally restricted to a figure in the region of 15 miles per hour.

Route Section III was largely on British motorways, with some rural parts, over a total distance of about 243.4 miles. In the tables below, "Overall" figures are also given, calculated on the basis of the complete route length of approximately 380.7 miles.

As a preliminary test, both cars were first driven over the test route, in convoy, without any prior modification of either car. Thus both of the cars were in their standard form, properly tuned and adjusted in the normal way, and the normally recommended 97 octane leaded petrol was used for both cars, employing the normal GX needle in the carburettor of each car. Weather conditions were clear, with light breeze blowing.

Measurements of fuel consumption were made for the two cars over each section of the route, the measurement being effected by filling the fuel tank initially up to a mark on the filler neck, and refilling it up to that mark, at the end of each Route Section, by means of calibrated measures. On this basis, the fuel economy (miles per gallon) for each car over each of the three sections of the route, and also an overall figure for the fuel economy over the complete test route, was calculated, and the results are given in Table 1 below.

TABLE 1

| Route Section: | (97 oct. leaded, GX needle) | | | |
|---|---|---|---|---|
| | I | II | III | Overall |
| fuel economy Car A(std.): | 54.1 | 40.2 | 51.4 | 50.6 |
| (m.p.g.) Car B(std.): | 53.7 | 44.5 | 49.6 | 49.6 |

It will be seen from the above Table 1 that car B, in its standard form, performed marginally less well (approximately 2% less in terms of fuel economy) overall, than car A in its standard form, although the fuel economy of car B was almost 11% better than that of car A over Section II (urban).

After completion of the test run, the cars were left over-night, and dynamometer tests were then made upon the cars, without interim adjustment, to check brake horse power (BHP) readings. These readings tended to show that the engine of car A was developing slightly more power than that of car B, the readings at 60 m.p.h. being respectively 19 BHP and 17 BHP for cars A and B respectively. For speeds above 60 m.p.h. the power readings of the two engines fell off fairly rapidly, as is usual with this car.

The cylinder-heads were then taken off both cars. The engine of car A was decarbonised as necessary, and its valves ground in, before the head was replaced. Car B was also subjected to a decarbonisation process, but in addition was modified, generally along the lines hereinbefore described (for a different engine) with reference to FIG. 2 of the accompanying drawings, to take exhaust valves of head diameter 33.5 mm. In this case, however, the widened exhaust passageway was machined into the cylinder-head, from the underside of the head 2 (though the valve port plane A—A) of FIG. 2, only to a depth of 7.5 mm., with a diameter of 30.0 mm; instead of continuing this enlargement smoothly through the plane Y—Y as in FIG. 2, the shoulder left by the machining, having an internal diameter of 23.6 mm, was merely rounded off somewhat at its inner edge. Thus the process of modification was simplified somewhat as compared with that of FIG. 2. The angle of the seat (9') was 45°, and its maximum (outer) diameter, after the modification, was 33.0 mm. It will be appreciated that the new exhaust valves were substantially 45.6% greater in area than the inlet valves.

After refitting of the heads, with no change to any other aspect of the engines, such as carburation, ignition timing, or inlet and exhaust manifolds, the cars were each given a 40 mile road test to bed-in the valves, and the heads were then re-tightened and adjusted in the usual manner, ready for the next test run. Thus prepared, the two cars were run over the test route again. Weather conditions were again clear, with only light breeze blowing. Fuel consumption measurements were made, as before, with results as given in Table 2 below.

TABLE 2

| Route Section: | (97 oct. leaded, GX needle) | | | |
|---|---|---|---|---|
| | I | II | III | Overall |
| Fuel economy Car A (std.): | 52.9 | 40.6 | 49.0 | 48.9 |
| (m.p.g.) Car B (mod.): | 55.6 | 50.4 | 50.9 | 52.0 |

As can be seen from the above Table 2, the modified car B gave fuel economy figures which exceeded those for car A by amounts varying from about 3.8% (in the motorway section) to as much as 24.1% (in the urban section), with an overall improvement of about 6.3%.

It will be appreciated that figures obtained from different test runs are not directly comparable with one another, because of the different conditions obtaining from day to day when the different test runs were carried out. However, it is perhaps worthy of note, from a comparison of Tables 1 and 2 above, that in the conditions of Table 2, for which Car A performed somewhat less well than it performed, overall, under the conditions of Table 1, the modified car B performed noticeably better than it performed under the conditions of Table 1, particularly in the urban section of the route.

Once again, with no interim adjustment, dynamometer tests were made upon the engines after an over-night rest, revealing no dramatic change in engine powers for most of the normal speed range, but the power of the modified car engine B was generally slightly higher now than that of car A. For example, the readings at 60 m.p.h. on this occasion were 17 BHP and 19 BHP respectively for cars A and B. Also of considerable interest was the fact that the fall-off in power at speeds above 60 m.p.h. was noticeably less rapid for the modified car B than for the standard car A. Thus, so far from producing a reduction of power, the modification of car engine B appeared to have improved its power readings somewhat.

The decarbonising, grinding-in, bedding-in and final adjustment procedures which followed the first test run, as described above, were then repeated on both car engines, without any further modification of the car engines, except that, for the purposes of a further test run, the normal GX needle of the standard HS2 carburettor was replaced by the above-mentioned weaker BO needle in each car. The further test run was then carried out as before, using a normal commercially available 97-octane leaded fuel that was used in the two test runs described above.

It will be appreciated that references herein to the octane number of normal leaded fuels are only approximate, to the extent that the commerically vended fuels used can probably be expected to vary in octane number, from sample to sample, by about ±1. Thus it can probably be expected that a gasoline sold commercially as having the octane number 97 has in fact an actual octane number somewhere in the range from 96 to 98.

Fuel economy readings obtained in respect of the further test run, which was carried out in conditions of high wind and rain, are given in Table 3 below.

TABLE 3

| Route Section | (97 oct. leaded, BO needle) | | | |
|---|---|---|---|---|
| | I | II | III | overall |
| Fuel economy (m.p.g) | Car A(std): 50.6 | 40.4 | 54.3 | 51.5 |
| | Car b (mod.): 51.7 | 48.2 | 56.8 | 54.5 |

Dynamometer tests as before, after this further test run, gave results very similar to those obtained after the test run of Table 2, and indeed this was found to be the case after each of the test runs described herebelow. In all cases, the power readings for the modified car were found to be slightly better overall than those for car A, with its standard exhaust valves.

After a repeat of the above-described decarbonising, grinding-in, bedding-in, and re-adjustment procedures, a test run was carried out using 91 octane leaded gasoline fuel, with the standard GX needle in the carburettor of each vehicle. The test run was carried out in overcast conditions, with light breeze, and results obtained were as indicated in Table 4 herebelow.

TABLE 4

| Route Section: | (91 oct. leaded, GX needle) | | | |
|---|---|---|---|---|
| | I | II | III | Overall |
| Fuel economy (m.p.g.) | Car A (std): 47.4 | 39.3 | 48.3 | 47.0 |
| | Car B (mod): 52.8 | 48.1 | 52.3 | 52.0 |

After the usual decarbonising, grinding-in, bedding-in, and re-adjustment of both car engines, a test run was then made using the 91 octane fuel in both cars, but this time with the BO neelde in the carburettor of each car. The weather conditions were dry, with light breeze, and the results achieved are given in Table 5 below.

TABLE 5

| Route Section: | (91 oct. leaded, BO needle) | | | |
|---|---|---|---|---|
| | I | II | III | overall |
| Fuel economy (m.p.g.) | Car A(std): 51.7 | 36.0 | 53.5 | 50.5 |
| | Car B (mod): 57.1 | 47.5 | 56.7 | 55.7 |

Following the usual decarbonising, grinding-in, bedding-in, and re-adjusting procedures on both cars again, prior to each test run, two more test runs were then made using a specially obtained supply of 92 octane lead-free gasoline in both cars. The GX needle was used in the carburettor of each car for one of these test runs, the results of which are summarised in Table 6 below, and the weaker BO needle was used in the carburettor of each car for the other test run, the results of which are summarised in Table 7 herebelow.

TABLE 6

| Route section: | (92 oct. lead-free, GX needle) | | | |
|---|---|---|---|---|
| | I | II | III | Overall |
| Fuel economy (m.p.g.) | Car A(std.): 49.8 | 43.5 | 53.3 | 51.1 |
| | Car B(mod.): 53.9 | 55.2 | 57.1 | 56.0 |

TABLE 7

| Route Section: | (92 Oct. lead-free, BO needle) | | | |
|---|---|---|---|---|
| | I | II | III | Overall |
| Fuel economy (m.p.g.) | Car A (std): 49.8 | 39.4 | 53.7 | 50.8 |
| | Car B (mod.): 52.1 | 47.5 | 56.0 | 53.9 |

The test run of Table 6 was carried out under showery conditions, with light winds, and that of Table 7 was carried out under dry and gusty conditions.

Even bearing in mind the above comments with regard to the difficulty of drawing any strictly valid conclusions from a comparison of two separate test runs, Tables 6 and 7 do seem to suggest that car B, modified in accordance with the present invention, was capable of performing extremely well on relatively low-octane lead-free gasoline as fuel, and indeed the driver of the modified car felt that it behaved particularly well under these conditions.

Not mentioned above is the fact that after each of the test runs of Tables 2 to 7 above, when dynomometer tests were made upon the power of each engine, emission tests were made to determine the proportions of carbon monoxide (CO) and hydrocarbons (HC) in the exhaust emissions of the modified car B, without any interim adjustment since the last preceding test run. For this purpose, a Horiba Mexa 500 CO-HC Analyser was used, with the engine running at wide open throttle on a "rolling road" machine. The engine tuning was set, prior to these emission tests, to give a CO content of 3% under idle running conditions, this giving satisfactory running for the engine and being within the limits specified by the appropriate EEC regulations. At the end of all the above-described test runs, the car B was returned to its standard form, with the original exhaust valves of head diameter 25.4 mm, and the emission tests were repeated on this car for each of the particular combinations of fuel and carburettor needle that was used in the above-described test runs. The results of these emission tests enabled the following Tables 8 to 13 to be compiled.

TABLE 8

| (97 oct. leaded, GX needle) | | | | | | |
|---|---|---|---|---|---|---|
| Road Speed (m.p.h.) | | 20 | 30 | 40 | 50 | 60 |
| CO | Car B (std.): | 4.2 | 5.0 | 4.2 | 3.4 | 4.0 |
| (%) | Car B (Mod.) | 4.2 | 3.7 | 3.2 | 2.9 | 4.4 |
| HC | Car B (std.): | 400 | 340 | 290 | 220 | 205 |
| (ppm) | Car B (Mod.): | 290 | 220 | 190 | 170 | 160 |

TABLE 9

| (97 oct. leaded, BO needle) | | | | | | |
|---|---|---|---|---|---|---|
| Road Speed (m.p.h.): | | 20 | 30 | 40 | 50 | 60 |
| CO | Car B (std): | 3.4 | 2.8 | 1.2 | 0.5 | 0.6 |
| (%) | Car B (mod.): | 3.7 | 3.2 | 1.4 | 0.5 | 1.2 |
| HC | Car B (std.): | 300 | 230 | 180 | 140 | 130 |
| (ppm) | Car B (mod.): | 300 | 220 | 160 | 130 | 120 |

TABLE 10

| (91 oct. leaded, GX needle) | | | | | | |
|---|---|---|---|---|---|---|
| Road Speed (m.p.h.) | | 20 | 30 | 40 | 50 | 60 |
| CO | Car B (std.): | 3.7 | 4.9 | 4.2 | 3.4 | 4.1 |
| (%) | Car B (mod.): | 3.5 | 3.2 | 2.6 | 2.4 | 4.0 |
| HC | Car B (std.): | 340 | 295 | 250 | 205 | 200 |
| (ppm) | Car B (mod.): | 300 | 220 | 195 | 160 | 150 |

TABLE 11

| (91 oct. leaded, BO needle) | | | | | | |
|---|---|---|---|---|---|---|
| Road Speed (m.p.h.) | | 20 | 30 | 40 | 50 | 60 |
| CO | Car B (std.): | 3.4 | 3.0 | 1.4 | 0.7 | 0.7 |
| (%) | Car B (mod.): | 2.6 | 2.4 | 0.9 | 0.4 | 0.7 |
| HC | Car B (std.): | 300 | 240 | 190 | 150 | 140 |
| (ppm) | Car B (mod.): | 310 | 210 | 165 | 120 | 110 |

TABLE 12

| (92 oct. lead-free, GX needle) | | | | | | |
|---|---|---|---|---|---|---|
| Road Speed (m.p.h.) | | 20 | 30 | 40 | 50 | 60 |
| CO | Car B (std.): | 3.5 | 5.0 | 4.4 | 3.6 | 4.3 |
| (%) | Car B (mod.): | 2.9 | 4.3 | 3.5 | 3.2 | 5.0 |
| HC | Car B (std.): | 500 | 400 | 350 | 300 | 290 |
| (ppm) | Car B (mod.): | 260 | 215 | 200 | 190 | 185 |

TABLE 13

| (92 oct. lead-free, BO needle) | | | | | | |
|---|---|---|---|---|---|---|
| Road Speed (m.p.h.): | | 20 | 30 | 40 | 50 | 60 |
| CO | Car B (std.): | 3.3 | 2.9 | 1.3 | 0.7 | 0.7 |
| (%) | Car B (mod.): | 2.9 | 2.8 | 1.3 | 0.7 | 1.2 |
| HC | Car B (std.): | 310 | 260 | 200 | 170 | 150 |
| (ppm) | Car B (mod.): | 300 | 240 | 180 | 140 | 130 |

The above emission Tables are probably more farily comparable with one another than are the fuel economy Tables 1 to 7, and indicate the considerable reductions of CO and HC emissions that can be achieved with an embodiment of the present invention, namely with car B (mod.), as compared with the car in its standard form, i.e. car B (std.), particularly with appropriate choice of fuel and carburettor needle. Indeed, the experiences of the above-described tests tended to bear out previous tentative impressions that had led to the carrying-out earlier of a road test of two other similar British Leyland Mini 1000 motor cars. In the earlier test, the two cars (referred to hereinafter as Car C and car D respectively) were run in convoy over a test route of about 659 miles. Car C was in completely standard form, with the GX needle, and usig normal 97 octane fuel as recommended by the manufacturers of the car. Car D had been modified to take the above-described larger exhaust valve having a head diameter of 33.5 mm., and was fitted with the weaker BO needle and run on 91 octane leaded fuel. Fuel economy figures obtained for this earlier test run are indicated below in Table A, at the right-hand side of which have also been included the figures obtained in a second run, carried out with car D alone, using lead-free gasoline.

TABLE A

| | Fuel Economy (m.p.g.) | | |
|---|---|---|---|
| Route Section | Car C standard GX,97 oct. leaded | Car D Modified BO,91 oct. leaded | Car D Modified BO, 92 oct. lead-free |
| 99 miles rural av. 40 m.p.h. | 46.8 | 52.6 | 54.0 |
| 39 miles urban av. 16 m.p.h. | 37.1 | 48.6 | 44.8 (av.14.5 m.p.h.) |
| 268 miles motorway av. 60 m.p.h. | 47.8 | 50.5 | 50.5 |
| 63 miles hilly av. 35 m.p.h. | 46.3 | 49.5 | 47.1 |
| 190 miles rural av.57.6 m.p.h. | 38.7 | 47.1 | 59.5 (av. 42.2 m.p.h.) |

Of course, the figures for the lead-free test run with car D alone are not directly comparable with the other figures in Table A, but they are included simply for general interest.

For comparison with Table A, Table B below is of interest, giving two sets of emission results derived from Tables 8 and 11 above for car B in the same respective forms as cars C and D (using leaded fuel) in Table A:

TABLE B

| | (derived from Tables 8 and 11) | | | |
|---|---|---|---|---|
| | CO (%) | | HC (ppm) | |
| Road Speed (m.p.h.) | Car B(std.) GX, 97 oct. leaded | Car B(mod.) BO, 91 oct. leaded | Car B(std.) GX 97 oct. leaded | Car B (mod.) BO, 91 oct. leaded |
| 20 | 4.2 | 2.6 | 400 | 310 |
| 30 | 5.0 | 2.4 | 340 | 210 |
| 40 | 4.2 | 0.9 | 290 | 165 |
| 50 | 3.4 | 0.4 | 220 | 120 |
| 60 | 4.0 | 0.7. | 205 | 110 |

Although Tables A and B above relate respectively to different examples of the same model of car, it seems reasonably fair to conclude therefrom that modification of one such car to take the larger exhaust valves in the manner described, together with the fitting of the weaker BO needle and the use of the lower-octane leaded fuel, can reasonably be expected to be capable of producing increases in fuel economy ranging from about 5% (motorway running) to as much as 30% (urban running), a reduction of the CO content of the exhaust emissions (measured as described above) by amounts varying from say 30% to about 80%, and reduction of the corresponding HC content of the exhaust emissions by amounts varying from say 20% to about 40%. In addition there is the inherent advantage of using the lower-octane fuel, namely less lead in the exhaust emissions. Taking into account also the above-mentioned apparent gain in power of the modified car B in the higher speed ranges, it is apparent that this modification can provide remarkably valuable overall results.

Also of some considerable interest was an EEC 1 5 Cycle Test carried out upon a further engine, of the same kind as the engines used in the above-mentioned cars A to D, in which the standard form of the engine, using 97 octane leaded petrol, was compared with the engine modified to take the larger exhaust valve mentioned above (33.5 mm head diameter). This modified engine was fitted with the weaker BO carburettor needle, and run on 92 octane lead-free gasoline. The results of these EEC tests, giving the quantities of CO, HC, and $NO_x$, emitted in the course of the tests, are summarised in Table C below.

TABLE C

| | (Car E, EEC 15 Cycle Test) | |
|---|---|---|
| Engine: | Standard HS2/GX | Modified HS2/BO |
| Fuel: (gasoline) | 97 oct., leaded | 92 oct., lead free |
| Idle CO % variation during test: | 0.5-2.5 | 1.5 -3.5 |
| CO (grams): | 40.4 | 33.4 |
| HC (grams): | 6.5 | 5.2 |
| NOx(grams): | 5.5 | 4.1 |

As seen, the modified version gave about 17% less CO, about 20% less HC, and about 25% less $NO_x$. In fact the EEC test concerned does not require measurement of the $NO_x$ emitted, but this measurement was included for general interest.

I claim:

1. A normally aspirated high-speed spark-ignition internal-combustion engine, for powering a motor vehicle, of the kind having a plurality of cylinders, each of which has a piston fitted therein and is provided with two and only two poppet valves, mounted separately from one another and constituting respectively a single inlet valve and a single exhaust valve, each of said poppet valves comprising a closure member mounted in a cylinder-head of the engine for movement into and out of closing engagement with one and only one valve seat therefor, and operable in accordance with a four-stroke cycle in which each piston is driven in its cylinder by expansion of gases heated by combustion of a gasoline-air mixture delivered to a combustion chamber at one end of the cylinder by way of the inlet valve of the cylinder, the combustion products being expelled from each cylinder, by way of its exhaust valve, to an exhaust manifold of the engine, and the compression ratio of the engine being less than 11:1, characterised in that the area ($\pi D^2/4$) of the exhaust valve of each cylinder is at least seven percent greater than that of the inlet valve.

2. An engine according to claim 1, wherein the compression ratio of the engine is in the range of 7:1 to 8.5:1.

3. An engine according to claim 1, wherein the exhaust valve area ($\pi D^2/4$) is in the range from 15% to 65% greater than the inlet valve area.

4. A method of improving a normally aspirated high-speed spark-ignition internal-combustion engine, for powering a motor vehicle, of the type having a plurality of cylinders, each of which has a piston fitted therein and is provided with two and only two poppet valves, mounted separately from one another and constituting respectively a single inlet valve and a single exhaust valve, each of said poppet valves comprising a closure member mounted in a cylinder-head of the engine for movement into and out of closing engagement with one and only one valve seat therefor, and operating in accordance with a four-stroke cycle in which each piston is driven in its cylinder by expansion of gases heated by combustion of a gasoline-air mixture delivered to a combustion chamber at one end of the cylinder by way of the inlet valve of the cylinder, the combustion products being expelled from each cylinder, by way of its exhaust valve, to an exhaust manifold of the engine, the compression ratio of the engine being less than 11:1, and the exhaust valves being of smaller area ($\pi D^2/4$) than the inlet valves, said method comprising the step of modifying the engine to make it an internal-combustion engine which is of the said type except that the area ($\pi D^2/4$) of the exhaust valve of each cylinder is at least seven percent greater than that of the inlet valve.

5. A method according to claim 4, wherein the exhaust valve area ($\pi D^2/4$) is made from 15% to 65% greater than the inlet valve are A.

6. A method according to claim 4, comprising a further step of modification whereby the compression ratio of the engine is reduced.

7. A method according to claim 6, wherein after modification of the engine its compression ratio is in the range from 7:1 to 8.5:1.

* * * * *